US006773221B2

(12) United States Patent
Belongia et al.

(10) Patent No.: US 6,773,221 B2
(45) Date of Patent: Aug. 10, 2004

(54) POSITIVE LOCKING MECHANISM FOR A WHEEL-ACTIVATED VEHICLE RESTRAINT

(75) Inventors: Paul Belongia, Milwaukee, WI (US); Norbert Hahn, Franklin, WI (US); Grant Leum, Muskego, WI (US); Jack Morehart, Janesville, WI (US); Reinhard Sander, Wauwatosa, WI (US)

(73) Assignee: Rite-Hite Holding Corporation, Milwaukee, WI (US)

(*) Notice: Subject to any disclaimer, the term of this patent is extended or adjusted under 35 U.S.C. 154(b) by 0 days.

(21) Appl. No.: 09/899,778

(22) Filed: Jul. 5, 2001

(65) Prior Publication Data

US 2003/0007850 A1 Jan. 9, 2003

(51) Int. Cl.[7] .................................................. B65F 9/00
(52) U.S. Cl. ........................ 414/401; 414/396; 414/584
(58) Field of Search .............................. 414/401, 396, 414/584; 188/32

(56) References Cited

U.S. PATENT DOCUMENTS

| 1,102,773 | A | 7/1914  | Martin     |
|-----------|---|---------|------------|
| 2,413,744 | A | 1/1947  | Carter     |
| 2,773,564 | A | 12/1956 | Garard     |
| 3,110,466 | A | 11/1963 | O'Sullivan |
| 3,221,907 | A | 12/1965 | O'Sullivan |

(List continued on next page.)

FOREIGN PATENT DOCUMENTS

| CA | 1308222  | 10/1992 |
|----|----------|---------|
| DE | 583 404  | 8/1933  |
| DE | 27 35 826| 2/1979  |
| DE | 3830891  | 3/1990  |

(List continued on next page.)

OTHER PUBLICATIONS

Photographs (5) of Combar wheel–restraint product; taken prior to Nov. 1991; 2 pages.
Brochure of Combar Product (in Dutch); Haagh Protection; circa 1991; 4 pages.
Brochure Wheelblocker by Dyna Seal with translation; Dyna Seal B.V.; circa 1993; 8 pages (4 pages Dutch with 4 page English translation).
Photographs (7) of Kelley Auto–Chock installation at Ford Detroit Parts Facility; taken Jun. 1991; 2 pages.
Product brochure for Auto–Chock; Kelley Company; circa 1991; 2 pages.
Drawings of Proposed Penta–Chock Installation for Coca–Cola; PentaLift, Inc.; dated Mar. 6, 1991; 2 pages.
Excerpt from *Barrometer* magazine regarding Stertil Combilok product; Huisorgaan Arro Electronics, B.V.; Nov. 1994; 4 p. (relevant material on page 4) (Dutch).
Infobulletin Brochure "Combilok Vrachtwagenblokkering"; Stertil, BV; circa 1993; 5 pages (Dutch).
Invoices Regarding 1999 Sale of a Wheel Lok GWL 2000 to Ben & Jerry's.
14 Sheets of Drawings Illustrating a Wheel Lok GWL 2000.

*Primary Examiner*—Richard W. Ridley
(74) *Attorney, Agent, or Firm*—Marshall, Gerstein & Borun LLP

(57) ABSTRACT

A wheel-activated vehicle restraint for use at a loading dock includes a wheel-blocking barrier that is selectively locked to a frame by a latching mechanism that engages an inverted gear rack. Components of the latching mechanism are arranged to prevent spreading apart upper and lower members of the frame members. The latching mechanism includes an alignment device that helps ensure that the teeth of a latching member positively engages the teeth of the gear rack, thus preventing the teeth from coming together peak-to-peak. An upper rail of the wheel restraint's frame includes a contoured leading edge that smoothly guides the lift of the wheel-blocking barrier from its stored position to its wheel-chocking position. A wheel support is used to prevent a vehicle's mud flap from getting pinched between the vehicle's wheel and a trigger assembly of the wheel restraint.

50 Claims, 8 Drawing Sheets

U.S. PATENT DOCUMENTS

| | | |
|---|---|---|
| 3,305,049 A | 2/1967 | Willey |
| 3,447,639 A | 6/1969 | Parr |
| 3,542,157 A | 11/1970 | Noah |
| 3,666,118 A | 5/1972 | Raynes et al. |
| 3,667,160 A | 6/1972 | Salloum |
| 4,013,145 A | 3/1977 | Mumm |
| 4,024,820 A | 5/1977 | Hlinsky et al. |
| 4,122,629 A | 10/1978 | Rennick |
| 4,146,888 A | 3/1979 | Grunewald et al. |
| 4,191,503 A | 3/1980 | Neff et al. |
| 4,207,019 A | 6/1980 | Cone |
| 4,208,161 A | 6/1980 | Hipp et al. |
| 4,216,724 A | 8/1980 | Grillet |
| 4,264,259 A | 4/1981 | Hipp |
| 4,267,748 A | 5/1981 | Grunewald et al. |
| 4,282,621 A | 8/1981 | Anthony et al. |
| 4,373,847 A | 2/1983 | Hipp et al. |
| 4,379,354 A | 4/1983 | Hahn et al. |
| 4,443,150 A | 4/1984 | Hahn et al. |
| 4,472,099 A | 9/1984 | Hahn et al. |
| 4,560,315 A | 12/1985 | Hahn |
| 4,572,080 A | 2/1986 | Williams et al. |
| 4,605,353 A | 8/1986 | Hahn et al. |
| 4,634,334 A | 1/1987 | Hahn et al. |
| 4,653,967 A | 3/1987 | Isaksson et al. |
| 4,674,941 A | 6/1987 | Hageman |
| 4,676,344 A | 6/1987 | Locicero |
| 4,695,216 A | 9/1987 | Erlandsson |
| 4,728,242 A | 3/1988 | Erlandsson |
| 4,759,678 A | 7/1988 | Hageman |
| 4,765,792 A | 8/1988 | Cherry et al. |
| 4,767,254 A | 8/1988 | Kovach et al. |
| 4,784,567 A | 11/1988 | Hageman et al. |
| 4,815,918 A | 3/1989 | Bennett et al. |
| RE32,968 E | 6/1989 | Hahn |
| 4,861,217 A | 8/1989 | Erlandsson |
| 4,865,508 A | 9/1989 | Carlson |
| RE33,154 E | 1/1990 | Hahn et al. |
| 4,915,568 A | 4/1990 | West |
| RE33,242 E | 6/1990 | Hipp et al. |
| 4,938,647 A | 7/1990 | Erlandsson |
| 4,963,068 A | 10/1990 | Gelder |
| 4,969,792 A | 11/1990 | Ellis et al. |
| 4,973,213 A | 11/1990 | Erlandsson |
| 5,096,021 A | 3/1992 | Tart |
| 5,249,905 A * | 10/1993 | Warner et al. ............... 414/401 |
| 5,375,965 A | 12/1994 | Springer et al. |
| 5,375,968 A | 12/1994 | Kollitz et al. |
| 5,531,557 A | 7/1996 | Springer |
| 5,553,987 A * | 9/1996 | Ellis .......................... 414/401 |
| 5,582,498 A * | 12/1996 | Springer et al. ............ 414/401 |
| 5,664,930 A | 9/1997 | Ellis |
| 5,709,518 A | 1/1998 | Alexander et al. |
| 5,762,459 A * | 6/1998 | Springer et al. ............ 414/401 |
| 6,092,970 A | 7/2000 | Hahn et al. |
| 6,238,163 B1 | 5/2001 | Springer et al. |
| RE37,570 E | 3/2002 | Springer et al. |
| 6,368,043 B1 * | 4/2002 | Leum et al. ................. 414/401 |
| 6,505,713 B1 | 1/2003 | Paul et al. |
| 6,524,053 B2 | 2/2003 | Hahn et al. |
| 2001/0026751 A1 * | 10/2001 | Berends ..................... 414/401 |

FOREIGN PATENT DOCUMENTS

| | | |
|---|---|---|
| DE | 42 42 415 | 2/1994 |
| EP | 0 384 850 | 8/1990 |
| EP | 0 302 356 | 3/1991 |
| EP | 0 537 075 | 4/1993 |
| EP | 0 580 415 | 1/1994 |
| EP | 0 609 049 | 8/1994 |
| EP | 0 639 488 | 2/1995 |
| EP | 0 784 588 | 7/1997 |
| EP | 0 868 376 | 10/1998 |
| EP | 0 905 066 | 3/1999 |
| EP | 0 919 496 | 6/1999 |
| EP | 1 190 969 | 3/2002 |
| FR | 2 284 481 | 4/1976 |
| FR | 2 394 423 | 1/1979 |
| FR | 2 652 340 | 3/1991 |
| FR | 2 672 578 | 8/1992 |
| FR | 2 682 343 | 4/1993 |
| FR | 2 689 845 | 10/1993 |
| IT | 526008 | 5/1955 |
| JP | 60-36230 | 2/1985 |
| NL | 157253 | 7/1978 |
| SU | 1036593 | 8/1983 |
| WO | WO 95/18029 | 7/1995 |
| WO | WO 95/24353 | 9/1995 |
| WO | WO 96/12665 | 5/1996 |
| WO | WO 97/19875 | 6/1997 |
| WO | WO 02/16238 | 2/2002 |

* cited by examiner

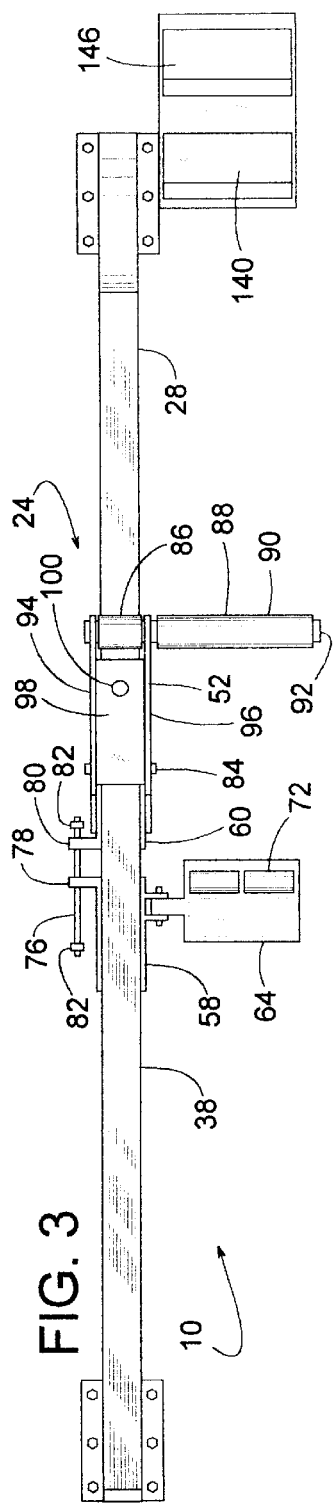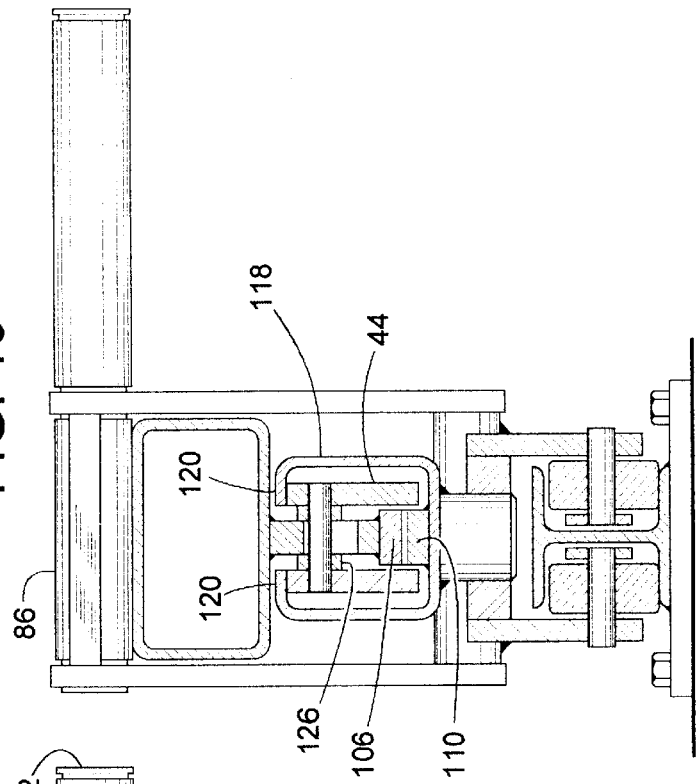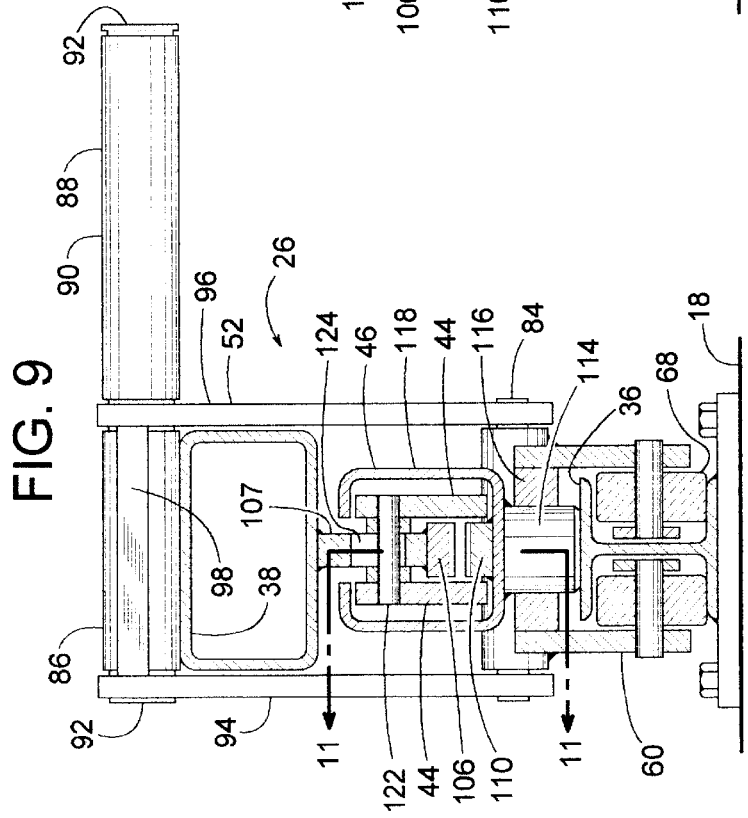

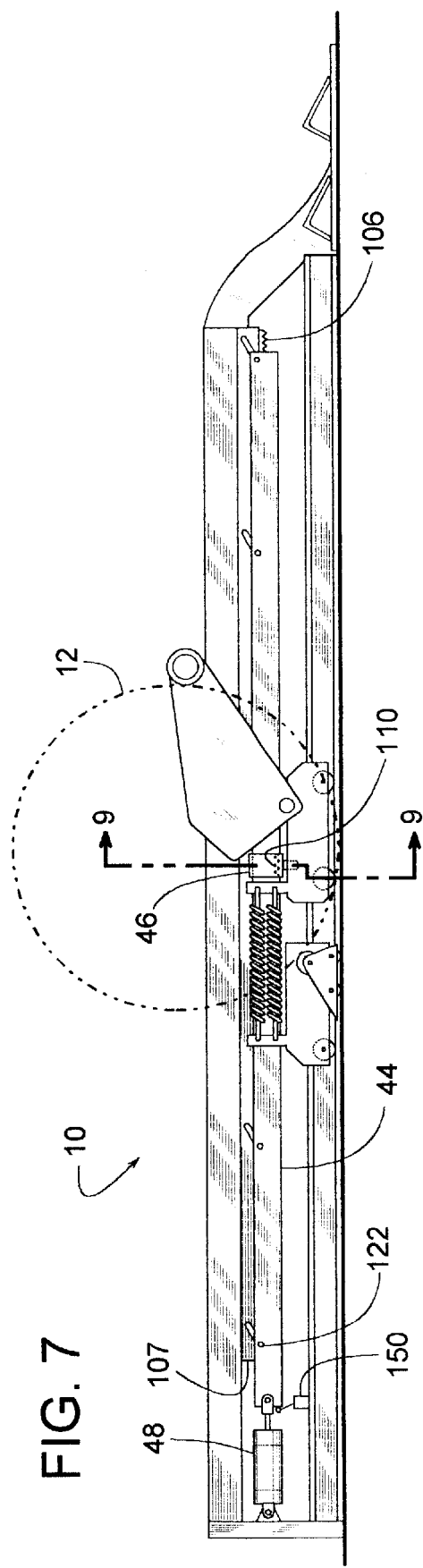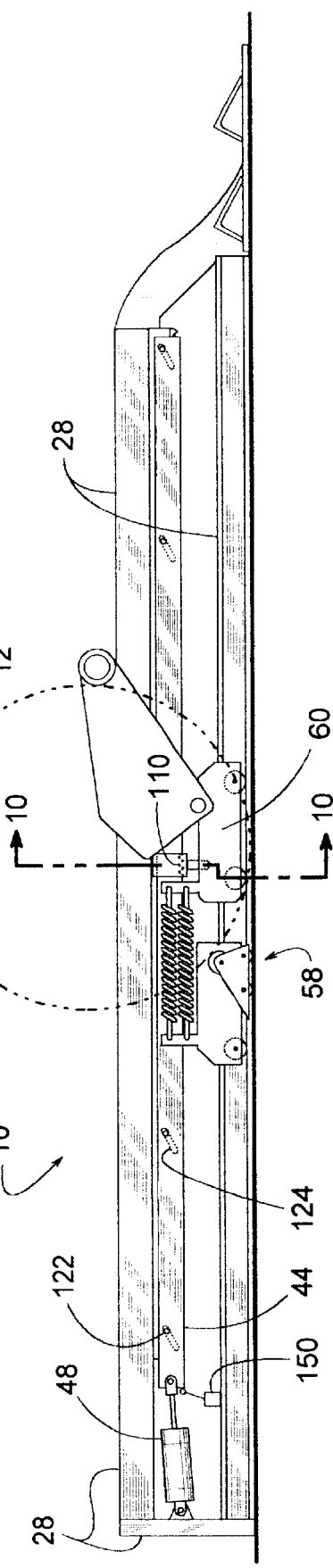

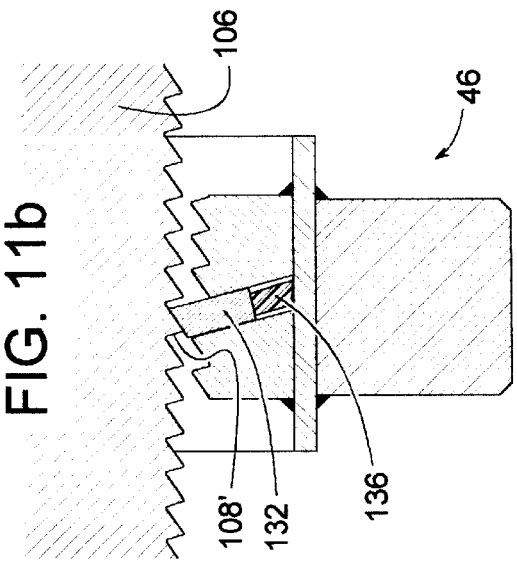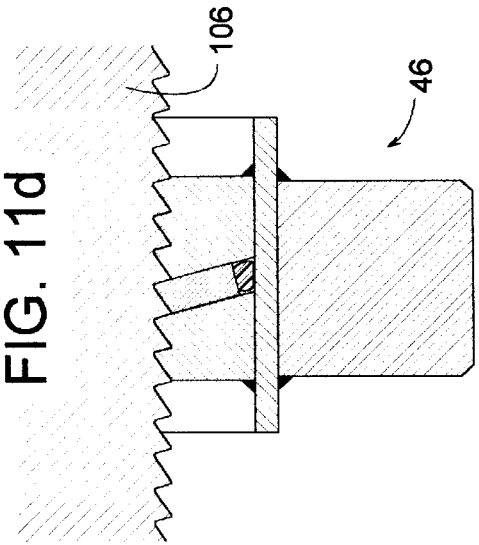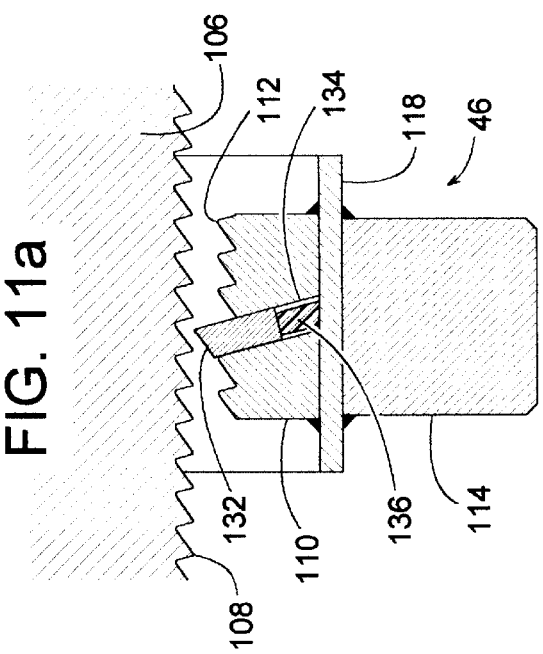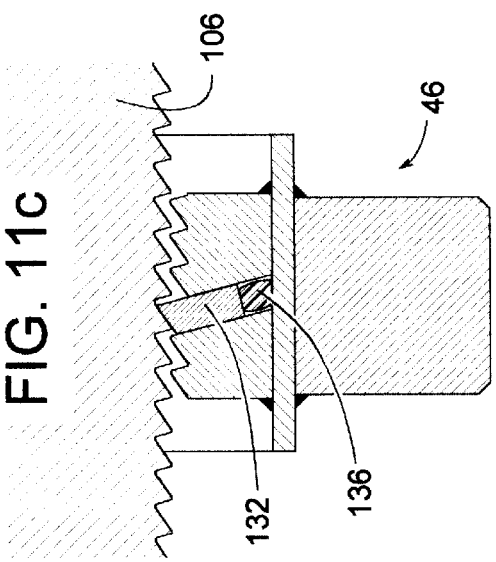

POSITIVE LOCKING MECHANISM FOR A WHEEL-ACTIVATED VEHICLE RESTRAINT

BACKGROUND OF THE INVENTION

1. Field of the Invention

The subject invention generally pertains to a system for restraining a vehicle at a loading dock, and more specifically to a vehicle restraint that is wheel-actuated.

2. Description of Related Art

In the loading and unloading of vehicles at a loading dock, heavy equipment such as forklifts pass into and out of the vehicle to facilitate and expedite the unloading and/or loading of the vehicle. Accordingly, it is important that the vehicle remain generally fixed relative to the loading dock to avoid accidents and to protect the safety of dock personnel. Otherwise, there is a potential hazard for the vehicle to inadvertently move away from the loading dock during the loading/unloading operation. If this were to occur without the knowledge of the dock personnel, they could continue to attempt to move cargo into or out of the vehicle while assuming the vehicle is secured at the dock. Thus, injury to personnel or damage to dock equipment could occur.

A common method of restraining a vehicle at a loading dock involves manually wedging wheel chocks in front of a vehicle's wheels. The use of wheel chocks, however, have several drawbacks: 1) the blocks are easily lost or damaged; 2) the blocks may not operate effectively due to a slippery road surface from oil, grit, rain, ice, or snow; 3) wheel chocks are awkward to handle and sometimes difficult to remove from the wedged position; 4) vehicles have been known to drive over wheel chocks; and 5) manually reaching underneath a vehicle (to insert or remove chocks) is inherently hazardous.

Given the potential hazards of such manual placement of wheel chocks, automated chocking systems have been employed. While such systems are safer and more convenient than manual positioning of chocks, they may have their own disadvantages. For example, such systems may not be suitable for some vehicles, because the vehicle's undercarriage, tailgate lifts, mud flaps or adjacent tires, may interfere with the movement of the chock as the chock attempts to engage the wheel. In addition, automated chocking systems may not be adjustable to accommodate the large range of tire sizes on cargo vehicles. Such systems may also be awkward, difficult and time consuming to engage and disengage from the vehicle parked at the dock.

To overcome the disadvantages of these earlier automated chocking devices, improved automated chocking systems are disclosed in U. S. Pat. Nos. 5,762,459 and 5,582,498 and in co-pending application Ser. No. 09/477,264; all of which are expressly incorporated by reference herein. The disclosure of the present invention provides further improvements and enhancements to the designs of the incorporated references.

SUMMARY OF THE INVENTION

In some embodiments, a vehicle restraint includes a latching member that engages an inverted gear rack whose gear teeth point downward to prevent dirt and ice from accumulating between the gear teeth.

In some embodiments, a vehicle restraint includes an upper rail with a contoured leading edge for smoothly guiding a wheel-blocking barrier from a stored position to an elevated wheel-chocking position.

In some embodiments, a wheel support helps prevent a low hanging mud flap from getting pinched between a trigger assembly of the vehicle restraint and the vehicle's wheel.

In some embodiments, a tooth alignment device helps align the teeth of a latching member to that of a gear rack.

In some embodiments, the tooth alignment device includes a movable alignment tooth that is offset relative to the pitch spacing of other teeth.

In some embodiments, the alignment tooth is spring loaded to protrude beyond adjacent teeth.

In some embodiments, the components of a vehicle restraint are arranged to avoid developing on the vehicle restraint's frame a bending moment that may otherwise exist as a latching member engages a gear rack.

BRIEF DESCRIPTION OF THE DRAWINGS

FIG. 3 is a top view of the vehicle restraint of FIG. 2, but with a lock assembly of the restraint moved to a chocking position.

FIG. 7 is similar to FIG. 6 with the restraint in the chocking position but with the restraint's lock assembly not yet latched in place.

FIG. 8 is similar to FIG. 7, but with the lock assembly locked in place.

FIG. 9 is a cross-sectional view taken along line 9—9 of FIG. 7.

FIG. 10 is a cross-sectional view taken along line 10—10 of FIG. 8.

FIG. 11a is a cross-sectional view taken along line 11—11 of FIG. 9 showing a latch member properly aligned but disengaged from a gear rack.

FIG. 11b is similar to FIG. 11a, but with an alignment tooth of the latch member just making contact with the gear rack.

FIG. 11c is similar to FIG. 11a, but showing the alignment tooth retracting into a pocket in the latch member.

FIG. 11d is similar to FIG. 11a, but with the latching member fully engaging the gear rack.

FIG. 12d is the same as FIG. 11d to illustrate how an initially misaligned latching member can end up fully engaged with the gear rack just as in the case of the properly aligned latching member of FIG. 11a.

DESCRIPTION OF THE PREFERRED EMBODIMENT

Figure 1:
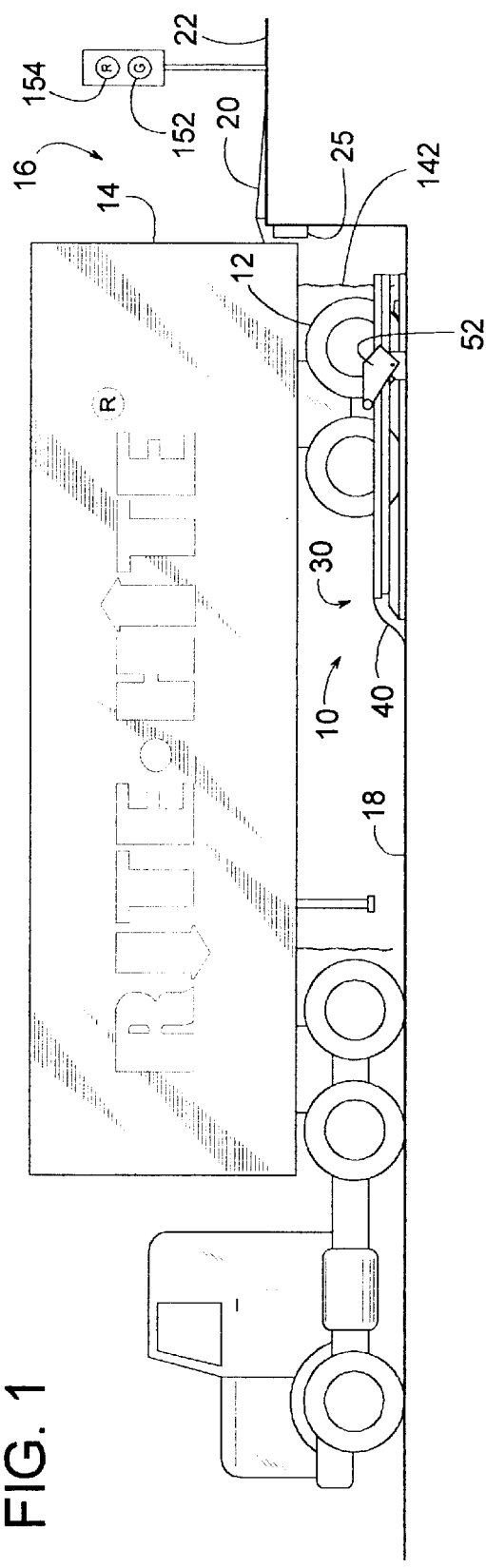
FIG. 1 is a side view of a vehicle parked at a loading dock and restrained by a vehicle restraint in a wheel-chocking position according to one embodiment.

A tire-actuated vehicle restraint 10 according to the present invention is shown in an illustrative operating environment in FIG. 1. The restraint device 10 engages a leading tire 12 of a vehicle 14 to maintain vehicle 14 in a loading/unloading position adjacent a loading dock 16. Throughout the specification and claims, the terms "wheel" and "tire" are used interchangeably and refer to the combination of a wheel and a tire rotatably mounted to a vehicle. Thus, an action performed on a tire is also performed on a wheel, and vice versa. Tire 12 is referred to as the "leading" tire as it is the first to approach dock 16 as vehicle 14 backs into position over a roadway 18. The term, "roadway" is meant to broadly encompass vehicle support surfaces of every kind including roads, driveways, ramps, bridges, pits, truck leveler surfaces, and the like.

As is conventional, dock 16 shown in FIG. 1 includes a dock leveler 20, which spans the gap between the rear of a truck and an elevated floor 22 of loading dock 16 to allow forklifts and other dock equipment and personnel to pass into and out of the bed of the vehicle. As leveler 20 is pivoted relative to dock 16, it also serves to compensate for height differentials between the bed of the truck and floor 22 as may arise during loading and unloading of the vehicle 14. As is also conventional, dock 16 may include a bumper 25 that a rear end of vehicle 14 may abut when vehicle 14 is in the loading/unloading position of FIG. 1.

In FIG. 1, vehicle restraint 10 is shown in a chocking and latched position in which restraint 10 helps prevent vehicle 14 from moving away from dock 16 while it is being loaded or unloaded. As will be described in greater detail below, restraint 10 is moved into the chocking position, in which a lock assembly 24 (see FIG. 2) engages the leading and trailing surfaces of wheel 12 by means of the dockward movement of wheel 12 itself. Accordingly, restraint 10 is referred to as being "wheel-activated." In addition, vehicle restraint 10 includes the feature of being variable to automatically accommodate and successfully chock wheels having a wide range of sizes. Once restraint 10 is in the chocking position, in which lock assembly 24 engages wheel 12, lock assembly 24 can be latched into position relative to dock 16 by an operator controlled latching mechanism 26. Once the operator controlled latching mechanism is activated, restraint 10 actively prevents vehicle 14 from moving away from the dock face. Conversely, de-activation of operator controlled latching mechanism 26 allows the vehicle to move away from dock 16 after the loading/unloading operation is completed, thereby re-positioning lock assembly 24 back in the stored position for activation by the wheel of the next vehicle.

Figure 2:
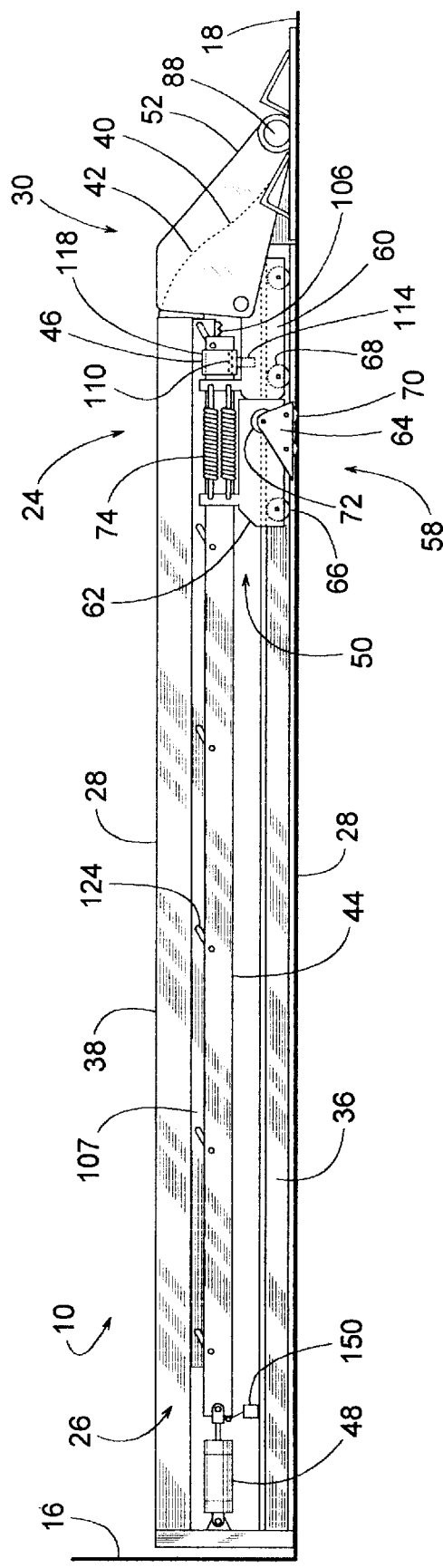
FIG. 2 is an opposite side view of the vehicle restraint of FIG. 1, however, with the vehicle removed and the restraint in a stored position.
Figure 6:
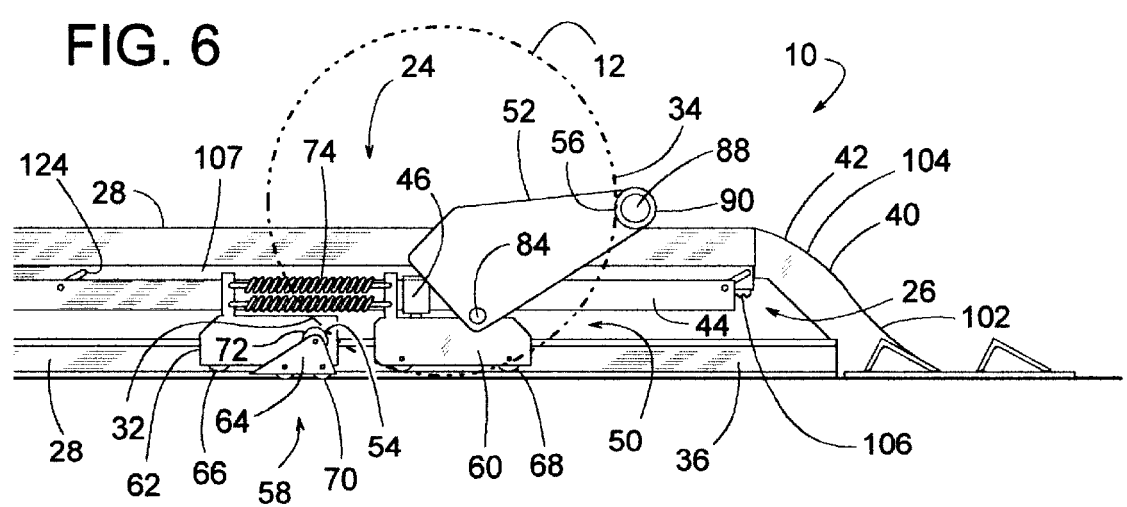
FIG. 6 is similar to FIG. 5, but with the restraint in the chocking position and the wheel even closer to the dock.

The elevation view of vehicle restraint 10 in FIG. 2 shows the various components comprising the restraint. Lock assembly 24 is shown in a stored position at the distal end of a frame 28. The end of frame 24 furthest from the dock 16 will be referred to as a distal end 30, while the end adjacent the dock face will be referred to as the dock end. According to the invention, the lock assembly is activated by wheel 12 as it travels in a dockward direction over roadway 18. In response, lock assembly 24 moves along frame 28 from the distal, stored position of FIG. 2 to a plurality of chocking positions, such as that shown in FIGS. 1, 3, and 6–10. The position shown in FIG. 6 is a chocking position, since wheel 12 is engaged on both its leading edge (as at 32) and at its trailing edge (as at 34). Once lock assembly 24 moves to a chocking position, further dockward movement of wheel 12 simply causes lock assembly 24 to move dockward along with the wheel. Once wheel 12 and vehicle 14 are adjacent the dock in the loading/unloading position, the operator controlled latching mechanism 26 may be actuated to latch lock assembly 24 in place along frame 28, thus blocking movement of vehicle 14 away from the dock.

Returning to FIG. 2, frame 28 includes a stationary member, illustratively in the form of a guide member 36 disposed adjacent roadway 18. In the present embodiment, and as seen in the cross-sectional of FIG. 9, guide member 36 is shown in the shape of an I-beam including an upper flange, a lower flange and a vertical web portion, the space between the flanges forming a track on each side of the web. The I-beam is fixed to roadway 18 in the present embodiment, although it could also be simply disposed along roadway 18 or spaced therefrom, depending on the nature of the installation. Frame 28 also includes an upper rail 38, which, in the present embodiment, is disposed above and separated from guide member 36. In some embodiments, rail 38 can be separate or connected to guide member 36. At its distal end, rail 38 includes a ramp portion 40, which is angled toward roadway 18. An upper surface 42 of ramp portion 40 serves as a camming surface to assist movement of lock assembly 24 from the stored position of FIG. 4 through an intermediated position of FIG. 5 and to the chocking position of FIG. 6, as described in greater detail below. Latching mechanism 26 includes a latching bar 44, shown depending from upper rail 38 and a latching member 46. In all, latching mechanism 26 comprises latching bar 44, latching member 46, a support bar 107, a bracket 118, pins 122, a gear rack 106, a gear rack segment 110, spacers 126, all of which will be explained later in greater detail. Latching mechanism 26 is actuated by an actuator 48 shown mounted to frame 28. Examples of actuator 48 include but are not limited to a hydraulic cylinder, pneumatic cylinder, motor-driven linear actuator, and various combinations thereof.

Lock assembly 24 includes an actuation assembly 50 and a locking arm 52 (also referred to as a locking arm or chock assembly). Actuation assembly 50 moves relative to and along frame 28, and serves to actuate locking arm 52 between the stored position of FIGS. 2 and 4 and the chocking position of FIG. 6 in response to the dockward movement of wheel 12 as vehicle 14 backs into the loading/unloading position adjacent the dock. At the same time, the structure of actuation assembly 50 serves to properly size the wheel and capture the leading edge at an engagement point 54 in FIG. 6, while moving locking arm 52 to capture the trailing edge of the wheel as at point 56 in FIG. 6.

To achieve the automatic positioning function and the wheel sizing function, actuation assembly 50 includes a trigger assembly 58, and a trolley assembly 60. Both trigger assembly 58 and trolley assembly 60 move linearly along guide member 36 between the stored position of FIG. 2 and a plurality of chocking positions, such as that shown in FIG. 6. Trigger assembly 58 also engages and moves along roadway surface 18 in response to movement of wheel 12. Toward that end, trigger assembly 58 comprises a guiding portion 62 and a tire-engaging portion 64. To allow trigger assembly 58 to move along guide member 36, the guiding portion, according to the present embodiment, includes rollers 66. Rollers 66 are received within the tracks formed in I-beam 36 between the top flange and bottom flange to guide the movement of trigger assembly 58. In a like manner, trolley assembly 60 includes rollers 68, which are also disposed within tracks in I-beam 36 to guide the movement of trolley assembly 60 along the I-beam guide member 36.

The tire-engaging portion 64 of trigger assembly 58, according to the present embodiment, includes roadway-engaging rollers 70 to provide a smooth rolling action as the tire-engaging portion 64 travels over roadway surface 18. Tire-engaging portion 64 also includes tire-engaging roller 72. Since the dockward traveling wheel 12 will engage roller 72 at an engagement point 54, the ability of this roller to rotate ensures that wheel 12 will not roll up and over the tire-engaging portion 64. Rather, the wheel will roll against roller 72, and the tire-engaging portion 64 will be pushed dockward under the influence of wheel 12.

Resilient members, such as springs 74, provide a coupling that couples trigger assembly 58 to trolley assembly 60, while allowing some relative movement between the two. Trolley assembly 60 and trigger assembly 58, according to the present embodiment, each include spring tabs for receiving the respective ends of the springs 74. Springs 74 allow trigger assembly 58 to move relative to trolley assembly 60 until the springs reach a predetermined amount of tension to facilitate movement of the trolley assembly in a dockward direction. As will be described in greater detail below, this action allows the actuation assembly 50 to adjust to properly size and engage tire 12 of vehicle 14 as it backs toward the loading/unloading position. According to some embodiments, a limiting assembly comprising a stop bar 76 (FIG. 3) is provided between trolley assembly 60 and the trigger assembly 58. Stop bar 76 limits the maximum separation between the trigger assembly 58 and the trolley assembly 60 to prevent springs 74 from being stretched beyond their limit. Stop bar 76 extends through holes in blocks 78 and 80 fixed to trigger assembly 58 and trolley assembly 60, respectively. The maximum separation distance is defined by the location of lock nuts 82. If the maximum separation is reached, stop bar 76 causes trolley assembly 60 to be pulled by trigger assembly 58 without further stretching of springs 74.

As can be seen in FIG. 6, locking arm 52 is disposed distally of the trigger assembly 58 and is operatively connected to trolley assembly 60. In the present embodiment, this operative connection is at a connection point, designated 84 in FIG. 6 and, which in the present embodiment comprises a pivotal connection. Connection point 84 and trigger assembly 58 are selectively positionable relative to each other, since trigger assembly 58 can move in a dockward direction without movement of trolley assembly 60 or locking arm 52.

Locking arm 52 includes a proximal end (relative to frame 28) adjacent connection point 84 of trolley assembly 60. Locking arm 52 also includes a first roller 86 (FIGS. 3, 9 and 10) disposed at its proximal end. As seen in the top view of FIG. 3, locking arm 52 also includes a wheel-blocking barrier 88 having a second roller 90 disposed at the distal end of the locking arm and projecting away from frame 28 into the path of wheel 12 along roadway 18. Preferably, rollers 86 and 90 are on a common shaft 92. As is also clear from FIG. 3, locking arm 52, according to the present embodiment includes sideplates 94 and 96 and a top plate 98. A hole 100 in top plate 98 provides a convenient place to temporarily insert a pipe or rod, which can then serve as a handle for manually manipulating actuation assembly 50 along upper rail 38.

Figure 4:
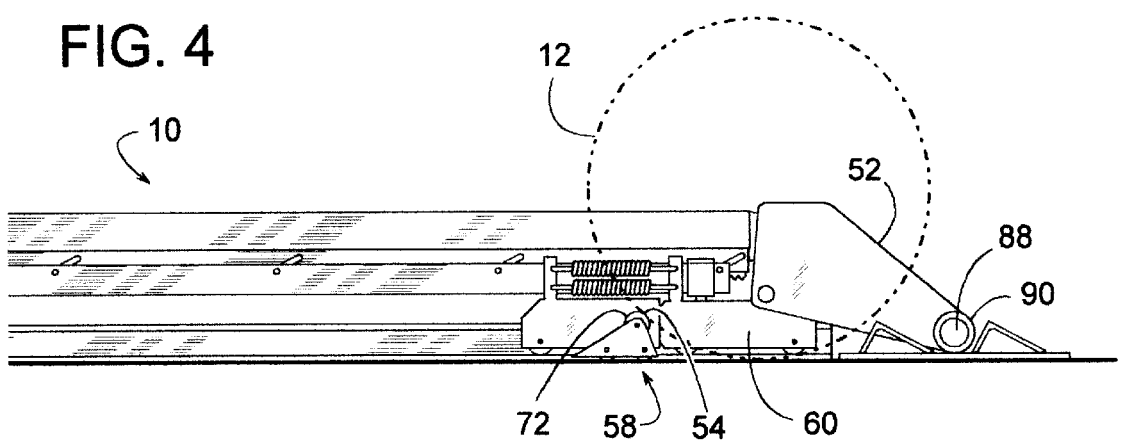
FIG. 4 is a partial side view of the vehicle restraint of FIG. 1, but with the restraint in its stored position and a wheel near the start of its dockward movement.
Figure 5:
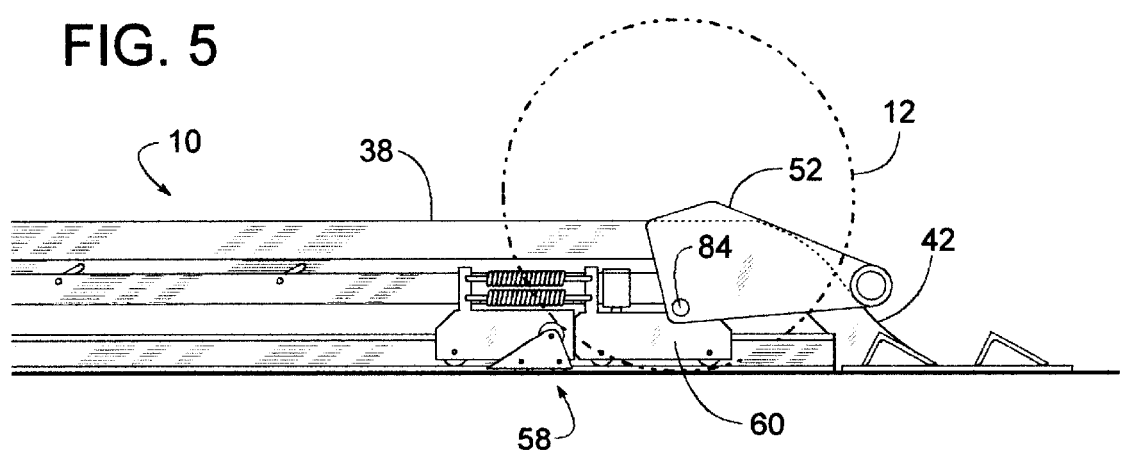
FIG. 5 is similar to FIG. 4, but with the wheel closer to the dock.

Locking arm 52 is intended to move from the stored position of FIG. 4 to the chocking position of FIG. 6 as actuation assembly 50 (comprising trigger assembly 58 and trolley assembly 60) moves in a dockward direction as activated by wheel 12. Referring to FIG. 5, as trolley assembly 60 moves in a dockward direction, connection point 84, between trolley 60 and locking arm 52 also moves dockward. This in turn causes roller 86 to begin moving along top camming surface 42 of ramp portion 40. Surface 42 is preferably curved to provide locking arm 52 with a smooth transition from its stored position of FIG. 4 to its elevated position of FIG. 6. In some cases, a lower section 102 of camming surface 42 is concave and an upper section 104 is convex to reduce the vertical acceleration and deceleration of roller 86 when locking arm 52 is near its stored position or near its fully elevated position. This enhances the tracing capability of roller 90 along the periphery of the tire. As roller 86 continues upward along camming surface 42, locking arm 52 rotates about pivotal connection point 84. As trolley assembly 60 continues dockward, roller 86 reaches the top of camming surface 42, and engages the generally horizontal top surface of upper rail 38. The locking arm is now in the chocking position where wheel-blocking barrier is elevated as shown in FIG. 6. Further dockward movement of trolley assembly 60 does not change the orientation of locking arm 52 and barrier 88 relative to the trolley assembly 60. Rather, locking arm 52 and barrier 88 simply stay in an elevated chocking position, and continue to move along with vehicle 14.

As locking arm 52 was moving from the stored position to the chocking position as just described, the attached second roller 90 was moving along with it. As will now be described in greater detail with reference to FIGS. 4–6. Such movement, as effected by movement of trigger assembly 58 and trolley assembly 60 as activated by wheel 12, properly sizes and chocks wheel 12 and allows roller 90 of barrier 88 to initially engage a bottom portion of wheel 12 and move along the peripheral surface of the tire to the chocking position shown in FIG. 6. FIG. 4 shows wheel 12 as it first engages trigger assembly 58 by contact at an engagement point 54 with the tire-engaging roller 72. Since locking arm 52 and roller 90 are disposed distally (to the right in the sense of FIG. 6) relative to trolley assembly 60, wheel 12 is now disposed between roller 90 and roller 72 of trigger assembly 58, thereby automatically adjusting itself to the size of wheel 12 shown in FIG. 6. Continued dockward movement of wheel 12 moves trigger assembly 58 in a dockward direction.

As the wheel 12 continues dockward, the tension within springs 74 allows trolley assembly 60 to be pulled in a dockward direction. As described in detail above, such dockward movement of trolley assembly 60 causes locking arm 52 and wheel-blocking barrier 88 to begin moving from their stored position (FIG. 4) toward the chocking position, such initial movement being shown in FIG. 5. The locking arm is thus resiliently biased from the stored position to a chocking position and moves to the chocking position by the engagement between the wheel and trigger mechanism 58. As locking arm 52 moves toward the chocking position, roller 90 of locking arm 88 moves along and maintains contact with the peripheral surface of wheel 12. During this operation, the separation between connection point 84 and trigger assembly 58 may increase as more of the wheel is positioned therebetween. This is a further example of selective positioning between trigger 58 and connection point 84. As the wheel continues toward the dock, trigger assembly 58 continues dockward and, because of springs 74, pulls trolley assembly 60 such that the trigger and trolley move together and effect the continued movement of locking arm 52 to the chocking position, as shown in FIG. 6.

Once locking arm 52 is in the chocking position, further dockward movement of wheel 12 simply translates lock assembly 24 further dockward, as it is maintained in the chocking position. When vehicle 14 is backed all the way up to the dock in the loading/unloading position, the latching mechanism 26 is actuated to hold locking arm 52 and barrier 88 in place along frame 28. Barrier 88 being elevated and held stationary can now prevent excessive movement of vehicle 14 away from the dock.

Latching mechanism 26 is actuated to latch lock assembly 24 into position along frame 28 when lock assembly 24 is in a chocking position as shown in FIG. 1, and once vehicle 14 has backed into the loading/unloading position adjacent dock 16. Latching mechanism 26, according to the present embodiment, latches lock assembly 24 in position along frame 28 by selectively securing trolley assembly 60 to a gear rack 106, which is fixed relative to frame 28. The term, "gear rack" is meant to encompass any elongated member having a series of spaced features such as teeth, holes, or indentations. Since locking arm 52 is operatively connected to trolley assembly 60, the securement of trolley assembly 60 to gear rack 106 (and thus securement to frame 28) also prevents movement of locking arm 52 in a direction away from the dock. Movement of vehicle 14 away from the dock is thus restrained.

To selectively secure trolley assembly 60 to gear rack 106, latching mechanism 26 includes latching member 46, which is carried by trolley 60 and selectively engageable with gear rack 106. In a preferred embodiment, gear rack 106 is attached to the underside of upper rail 38 by way of a support bar 107. In the present embodiment, gear rack 106 has a series of gear teeth 108 (FIG. 11a) that point downward to inhibit dirt and ice from plugging the space between the teeth. Latching member 46 includes a similar but much shorter segment 110 of gear rack 106 that can move vertically relative to trolley assembly 60; however, horizontal movement between latching member 46 and trolley assembly 60 is very limited. The gear teeth 112 of latching member 46 point upward so latching member 46 can be lifted up against gear rack 106 to engage teeth 112 with teeth 108.

To provide vertical movement between latching member 46 and trolley assembly 60, latching member 46 includes a shank 114 that slides vertically within a hole in a top plate 116 (FIG. 9) of trolley assembly 60. Latching member 46 also includes a bracket 118 with upper flanges 120 (FIG. 10). Bracket 118 helps shelter gear segment 110 from dirt and ice and allows latching bar 44 to raise and lower latching member 46. In a preferred embodiment, two latching bars 44 slide along either side of gear rack 106 and support bar 107. Latching bars 44 extend through bracket 118 to engage its upper flanges 120, which enables the vertical movement of latching bars 44 to raise and lower latching member 46 in and out of engagement with gear rack 106.

Figure 13:
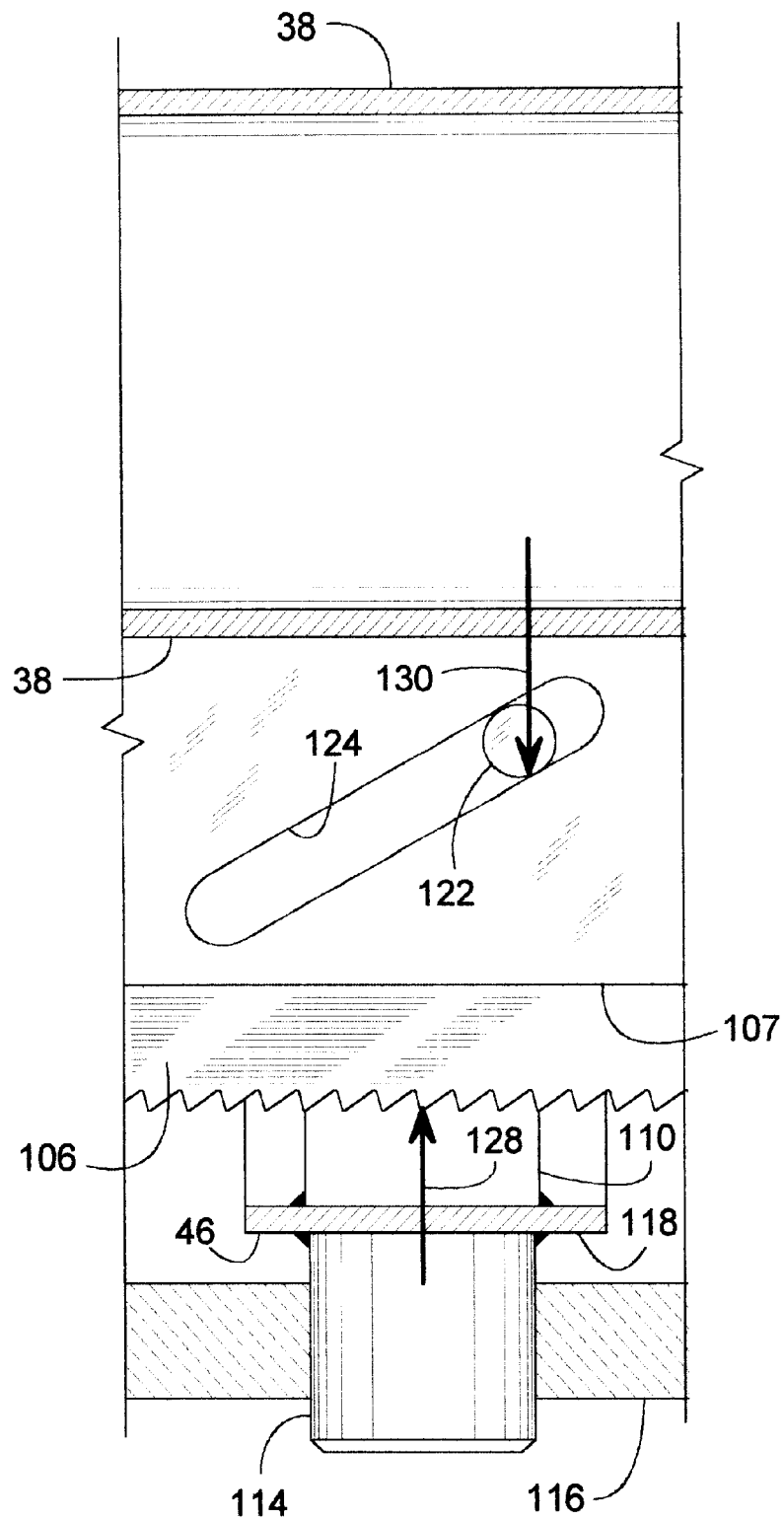
FIG. 13 is similar to FIGS. 11d and 12d, but with the cross-sectional lines omitted to clearly show forces associated with the latching mechanism in the latched position.

Coupling each latching bar 44 to support bar 107 provides vertical movement of latching bar 44. A series of pins 122 interconnecting latching bars 44 also extends through a corresponding series of sloped slots 124 in bar 107 (FIG. 13). Because pins 122 are free to slide within slots 124, linear movement of latching bar 44 in a direction parallel to upper rail 38 translates into vertical movement of latching bar 44. Spacers 126 allow gear rack 110 to fit between latching bars 44 and minimizes wear between support bar 107 and latching bars 44. In addition, various other wear pads can be installed to protect other surfaces subject to sliding motion and wear. In reference to FIGS. 7 and 8, as actuator 48 extends to move latching bar 44 to the right, pins 122 engage the sidewalls of slots 124 such that the sidewalls urge latching bar 44 upward, which in turn forces latching member 46 to engage gear rack 106. Actuator 48 retracting moves latching bar 44 to the left, which lowers and disengages latching member 46 from gear rack 106. Thus, selectively extending and retracting actuator 48 respectively locks (FIG. 8) and releases (FIG. 7) locking arm 52 relative to frame 28. Initiating the actuation of actuator 48 can be done in any conventional manner, such as in response to the action of a dockworker (e.g., operating a push button, switch, lever, etc.) or in response to an automatic sensor that determines that vehicle 14 is properly parked at the dock and is ready to be loaded or unloaded.

The physical relationship of upper rail 38, support bar 107, gear rack 106, pin 122, slot 124, and latching member 46 are such that the latching force does not tend to spread upper rail 38 and lower guide member 36 apart. Rather, the latching force is isolated to certain components of latch mechanism 26, such as latching member 46, gear rack 106, support bar 107 and pin 122. With latching member 46 being interposed between rail 38 and guide member 36 in the configuration shown in FIGS. 9 and 13, an upward latching force 128 exerted by latching member 46 against gear rack 106 is countered by a corresponding reaction force 130 that pin 122 exerts against a side wall of slot 124 in support bar 107. Since forces 128 and 130 are not transmitted through rail 38 and guide member 36, those structures do not need to be designed to withstand such forces.

When lifting bar 44 lifts latching member 46 against gear rack 106, the gear teeth of both members may initially meet peak-to-peak, rather than meshing into full engagement. When this occurs, only slight incidental movement of lock assembly 24 is needed to jog the members from peak engagement to full engagement. Such incidental movement can occur naturally or can be deliberately forced by providing latch member 46 with an alignment member that guides latching member 46 and gear rack 106 together. In some embodiments, the alignment member is a spring-loaded alignment tooth 132, as shown in FIGS. 11a–11d and 12a–12d. In this example, alignment tooth 132 slides along an angle within a pocket 134 in gear segment 110. A spring 136 (e.g., resilient polymeric spring, coil spring, leaf spring, etc.) biases alignment tooth 132 to protrude above teeth 112. When extended, alignment tooth 132 is displaced or offset relative to whatever certain pitch that teeth 112 are distributed, wherein the pitch is the peak-to-peak or center-to-center spacing of teeth 112. When alignment tooth 132 retracts within pocket 134, alignment tooth 132 becomes aligned with the same pitch as teeth 112. Such a tooth alignment system ensures solid engagement between the teeth of latching member 46 and gear rack 106 regardless of how the two are aligned as they initially come together.

If the teeth of gear rack 106 and latching member 46 are properly aligned as they start coming together, the operating sequence generally follows that of FIGS. 11a–11d. FIG. 11a shows latching member 46 properly aligned directly underneath gear rack 106. As latching member 46 rises, alignment tooth 132 touches one tooth 108' of gear rack 106, as shown in FIG. 11b. As latching member 46 continues rising, alignment tooth 132 slides along the back of tooth 108', while spring 136 compresses, as shown in FIG. 11c. Finally, in FIG. 11d, alignment tooth 132 retracts completely as teeth 112 of latching member 46 fully engage teeth 108 of gear rack 106.

Figure 12B:
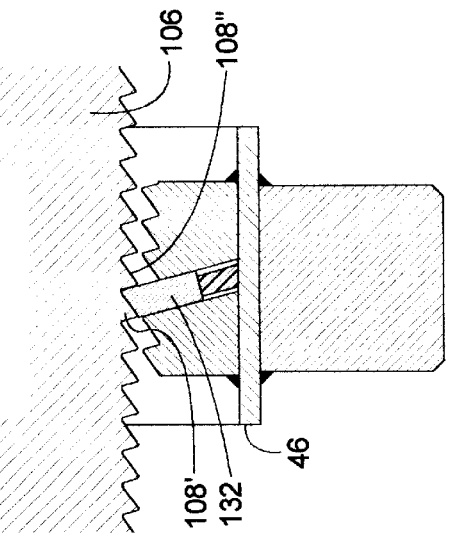
FIG. 12b is similar to FIG. 12a, but showing an alignment tooth of the latching member engaging the gear rack.
Figure 12D:
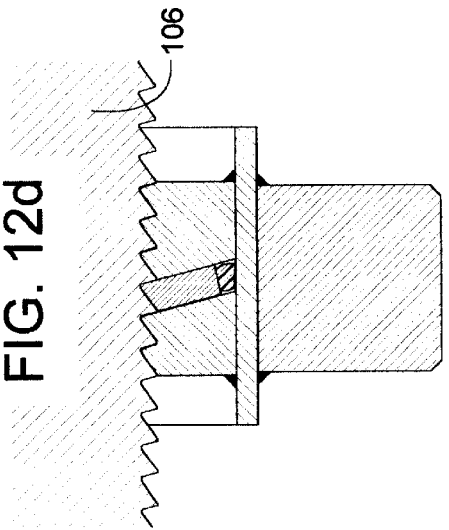
Figure 12A:
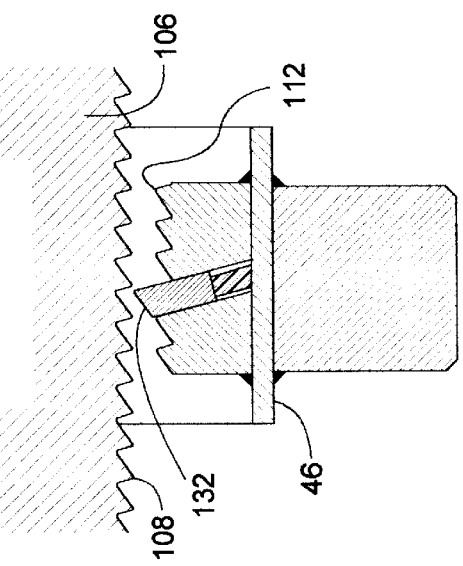
FIG. 12a is similar to FIG. 11a, but with the teeth of the latching member and the gear rack in peak-to-peak alignment with each other.
Figure 12C:
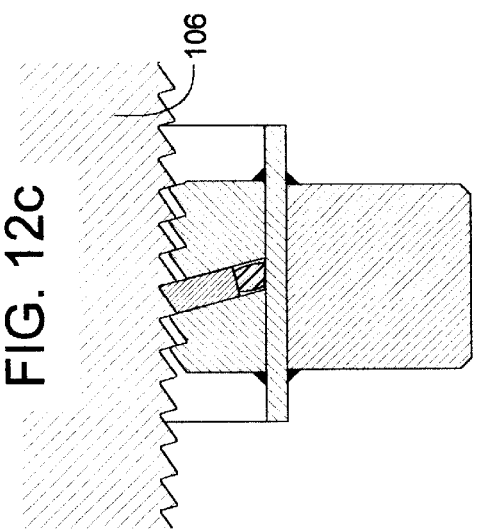
FIG. 12c is similar to FIG. 12b, but showing how the engagement of the alignment tooth in the gear rack and the tooth's retraction into an angled pocket corrects the alignment of the latching member to the gear rack.

If members 46 and 106 are aligned so the peaks of their teeth will meet, as shown in FIG. 12a, then the operating sequence generally follows that of FIGS. 12a–12d. In FIG. 12b, latching member 46 inserts alignment tooth 132 between teeth 108' and 108" of gear rack 106. In FIG. 12c, continued upward movement of latching member 46 forces latching member 46 to shift slightly over to the left as the upward movement forces alignment tooth 132 to retract. The shifting motion of latching member 46 is provided by clearance or anticipated give between or within restraint 4 and vehicle 14. As alignment tooth 132 shifts over, teeth 112 of latching member 46 are able to fully engage teeth 108 of gear rack 106, as shown in FIG. 12d (which is the same end result as shown in FIG. 11d).

Figure 14:
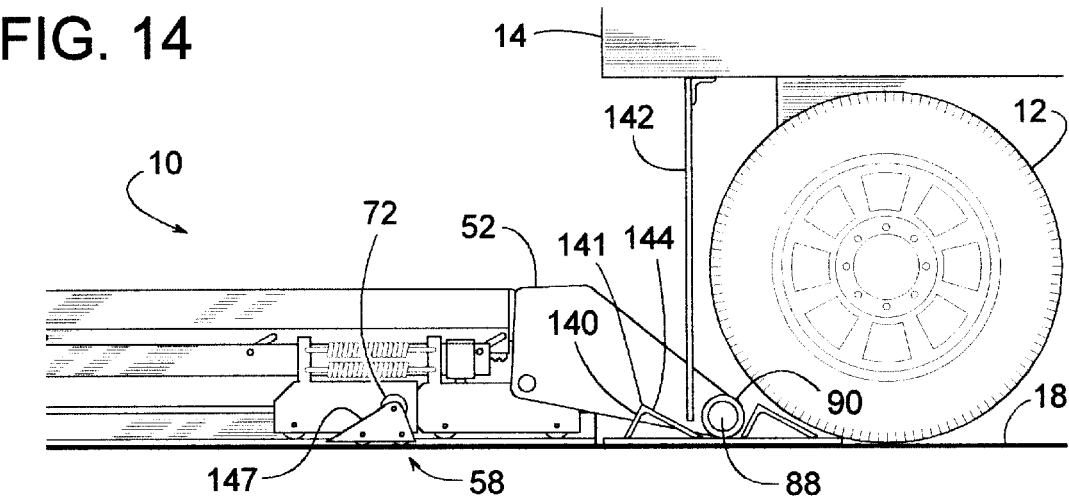
FIG. 14 is a first of three drawings showing the sequence of a wheel entering the actuation assembly of the vehicle restraint of FIG. 1.
Figure 15:
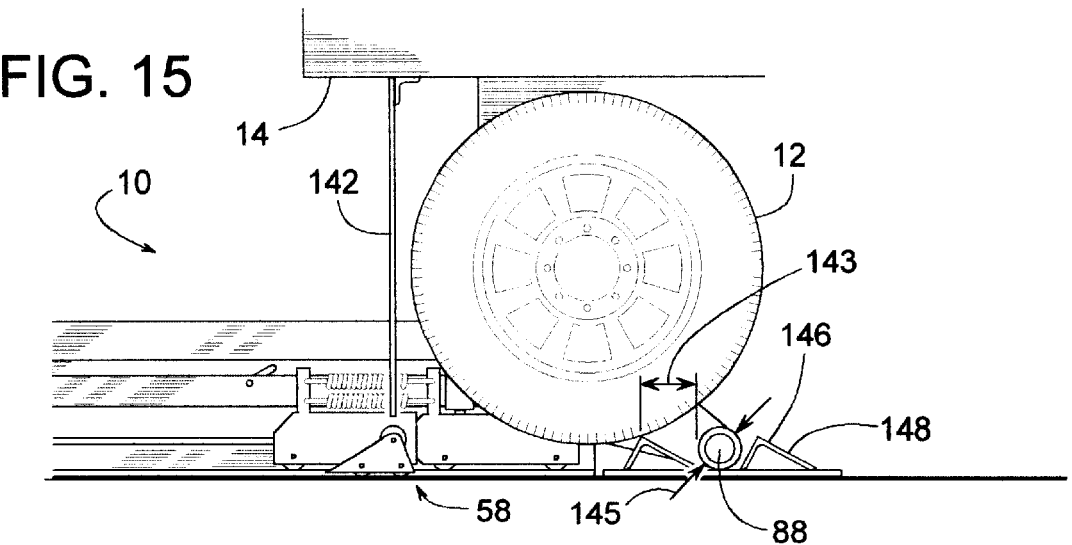
FIG. 15 is a second of three drawings showing the sequence of a wheel entering the actuation assembly of the vehicle restraint of FIG. 1.
Figure 16:
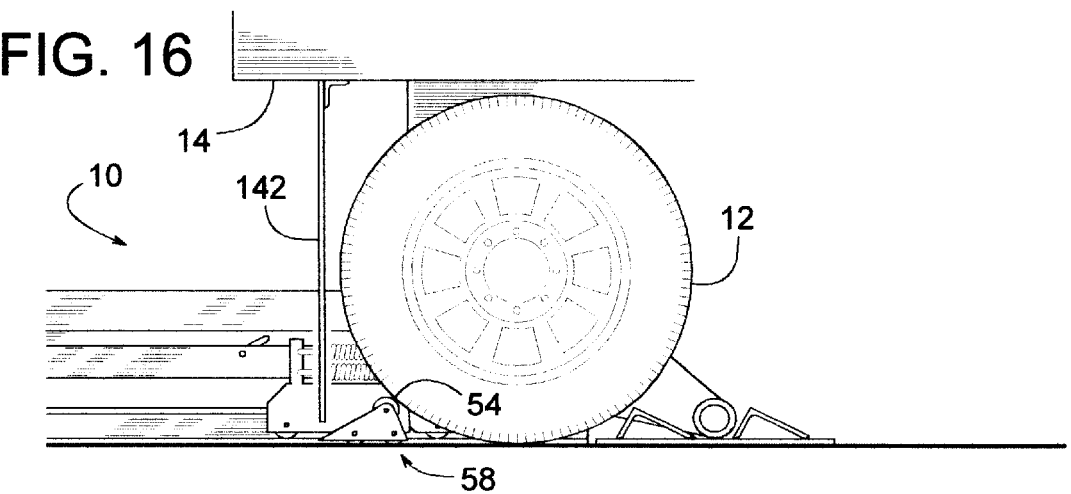
FIG. 16 is a third of three drawings showing the sequence of a wheel entering the actuation assembly of the vehicle restraint of FIG. 1.

In some embodiments, as vehicle 14 begins backing into dock 16, a first wheel support 140 helps prevent a mud flap 142 of vehicle 14 from getting pinched at engagement point 54 between wheel 12 and tire-engaging roller 72 of trigger assembly 58. Wheel support 140 includes an upper surface 141 that protrudes above roadway 18 at a location between tire-engaging roller 72 and barrier 88 when locking arm 52 is at its stored position of FIG. 14. In this way, wheel support 140 forces vehicle 14 to lift the lower edge of mud flap 142 up and over tire-engaging roller 72. The process is shown sequentially in FIGS. 14, 15 and 16.

The size and location of wheel support 140 can affect its function significantly. If upper surface 141 is too high, it tends to cut into the tire. If upper surface 141 is too low or too close to roller 90 of barrier 88, wheel support 140 becomes ineffective in lifting mud flap 142 over tire-engaging roller 72. Upper surface 141 of wheel support 140 should be a predetermined distance 143 away from roller 90, with distance 143 being greater than a diameter 145 of roller 90. Distance 143 is preferably about 6.75 to 7.75 inches when roller diameter 145 is 3.5 inches. Also, good results have been achieved when the uppermost point or apex of surface 141 is no higher than roller 90, and no more than one-inch lower than the upper surface of roller 90. Wheel support 140 preferably includes an inclined surface 144, so barrier 88 does not catch on wheel support 140, which might prevent locking arm 52 from traveling along camming surface 42. In some embodiments, trigger assembly 58 includes an upper inclined surface 147 facing away from wheel support 140. Inclined surface 147 helps guide a lower edge of mud flap 142 away from tire-engaging roller 72 as wheel 12 start descending upon driving back off of wheel support 140.

In some cases, another wheel support 146 can be installed on the other side of barrier 38. Here, wheel support 146 includes an inclined surface 148 that smoothly leads wheel 12 over barrier 88. Wheel supports 140 and 146 can each be provided with a second inclined surface. Having a pair of inclined surfaces provides a relatively strong wheel support structure with a minimal amount of material. Moreover, the second inclined surface of wheel support 140 provides wheel 12 with a ramp for traveling over barrier 88 upon departing the loading dock.

In some embodiments, the vehicle restraint may include signaling components to enhance the safety of vehicle loading and unloading. As one example of such safety enhancements, the restraint according to the invention may be provided with a switch that is responsive to movement of latching bar 44 to the latching position for illuminating a visual signal. For this purpose, a switch 150 is disposed at a position such that it will sense movement of latching bar 44 to the latching position. In the present embodiment, this is achieved by switch 150 being disposed adjacent one end of latching bar 44 when latching bar is in the unlatched position of FIG. 7. As latching bar 44 moves to the latching position of FIG. 8, latching bar 44 interacts with switch 150; causing it to emit a signal that latching bar 44 is in the latching position. Switch 150 may be any of a variety of sensors, including (by way of example) electromechanical, magnetic and electro-optic sensors. Accordingly, the "interaction" of latching bar 44 with switch 150 may be a mechanical interaction, or it may simply be bar 44 passing in front of an electric eye or the like. In any event, latching bar 44 is shown interacting with switch 150 in the position of FIG. 8. Switch 150 is further connected to electronics (not shown), which illuminate a visual signal, such as a green light 152 (FIG. 1) upon movement of latching bar 44 to the latching position. Since the activation of switch 150 serves as an indication that a vehicle is safely restrained at loading dock 16, an inside green light 152 serves as an indication to the dock personnel that vehicle 14 is restrained and may be safely loaded or unloaded. In addition, the switch 150 may also serve to illuminate a corresponding outside red signal (not shown). An inside red light 154 responsive to switch 150 serves as an indication to the dock personnel that the vehicle is not restrained in a loading/unloading position.

Although the invention is described with reference to a preferred embodiment, it should be appreciated by those skilled in the art that various modifications are well within the scope of the invention. Therefore, the scope of the invention is to be determined by reference to the claims that follow.

We claim:

1. A vehicle restraint for blocking the traveling movement of a wheel of a vehicle on a roadway in order to prevent movement of the vehicle from a fixed position, the vehicle restraint comprising:
    a frame adapted to be fixed relative to the roadway;
    a trolley assembly moveable along the frame;
    a locking arm coupled to the trolley assembly and being adapted to engage the wheel for the purpose of restraining the wheel;
    a gear rack supported by the frame, wherein the gear rack includes a first plurality of teeth that point downward; and
    a latching member coupled to the trolley assembly and being moveable between an engaged position and disengaged position, wherein the latching member in the engaged position engages the gear rack to restrain horizontal movement of the locking arm, and the latching member in the disengaged position disengages the gear rack to allow horizontal movement of the locking arm.

2. The vehicle restraint of claim 1, further comprising a lifting bar coupled to the latching member and moveable along an incline to selectively raise and lower the latching member between its engaged and disengaged positions.

3. The vehicle restraint of claim 1, wherein the latching member includes a second plurality of teeth substantially evenly distributed at a certain pitch.

4. The vehicle restraint of claim 3, wherein the latching member includes an alignment tooth displaced from the certain pitch.

5. The vehicle restraint of claim 4, wherein the alignment tooth is moveable relative to the second plurality of teeth.

6. The vehicle restraint of claim 4, further comprising a spring that biases the alignment tooth to move to a certain position relative to the second plurality of teeth.

7. The vehicle restraint of claim 4, wherein the alignment tooth protrudes above the second plurality of teeth.

8. The vehicle restraint of claim 7, wherein the gear rack is interposed between the guide member and the upper rail.

9. The vehicle restraint of claim 1, further comprising an actuator adapted to control a lifting bar adapted to engage and disengage the latching member with the gear rack.

10. The vehicle restraint of claim 1, further comprising:
a trigger assembly moveable along the frame and being adapted to be engaged by the wheel; and
a coupling that couples the trolley assembly to the trigger assembly, wherein the coupling allows relative movement therebetween.

11. The vehicle restraint of claim 10, wherein the frame includes a guide member, along which the trolley assembly and the trigger assembly travel, and an upper rail, along which the locking arm travels.

12. The vehicle restraint of claim 11, wherein the gear rack is supported by the upper rail.

13. The vehicle restraint of claim 11, wherein the gear rack is interposed between the guide member and the upper rail.

14. The vehicle restraint of claim 11, wherein the latching member in the engaged position creates an upward force against the gear rack and a corresponding reaction force, wherein the upward force and the corresponding reaction force avoid being transmitted to the upper rail.

15. The vehicle restraint of claim 11, wherein the latching member in the engaged position creates an upward force against the gear rack and a corresponding reaction force, wherein the upward force and the corresponding reaction force avoid being transmitted to the guide member.

16. The vehicle restraint of claim 11, further comprising a lifting bar coupled to the latching member and moveable along an incline to selectively raise and lower the latching member between its engaged and disengaged positions, wherein the weight of the lifting bar is carried by the upper rail.

17. The vehicle restraint of claim 16, further comprising a support bar that couples the lifting bar to the upper rail.

18. The vehicle restraint of claim 17, wherein the support bar has a plurality of inclined slots.

19. The vehicle restraint of claim 18, wherein the lifting bar includes a plurality of pins that extend through the plurality of inclined slots.

20. A vehicle restraint for blocking the traveling movement of a wheel of a vehicle on a roadway in order to prevent movement of the vehicle from a fixed position, the vehicle restraint comprising:
a guide member adapted to be fixed relative to the roadway;
an upper rail disposed higher than the guide member;
a trolley assembly moveable along the guide member;
a locking arm coupled to the trolley assembly and being moveable along the upper rail, wherein the locking arm is adapted to engage the wheel for the purpose of restraining the wheel;
a gear rack supported by the upper rail; and
a latching member coupled to the trolley and disposed between the guide member and the upper rail, the latching member being moveable between an engaged position and disengaged position, wherein the latching member in the engaged position engages the gear rack to restrain horizontal movement of the locking arm, and the latching member in the disengaged position disengages the gear rack to allow horizontal movement of the locking arm.

21. The vehicle restraint of claim 20, wherein the latching member in the engaged position creates an upward force against the gear rack and a corresponding reaction force, wherein the upward force and the corresponding reaction force avoid being transmitted to the upper rail.

22. The vehicle restraint of claim 20, wherein the latching member in the engaged position creates an upward force against the gear rack and a corresponding reaction force, wherein the upward force and the corresponding reaction force avoid being transmitted to the guide member.

23. The vehicle restraint of claim 20, further comprising a lifting bar coupled to the latching member and moveable along an incline to selectively raise and lower the latching member between its engaged and disengaged positions.

24. The vehicle restraint of claim 20, further comprising a lifting bar coupled to the latching member and moveable along an incline to selectively raise and lower the latching member between its engaged and disengaged positions wherein the weight of the lifting bar is carried by the upper rail.

25. The vehicle restraint of claim 24, further comprising a support bar that couples the lifting bar to the upper rail.

26. The vehicle restraint of claim 25, wherein the support bar has a plurality of inclined slots.

27. The vehicle restraint of claim 26, wherein the lifting bar includes a plurality of pins that extend through the plurality of inclined slots.

28. The vehicle restraint of claim 20, wherein the latching member includes a plurality of teeth substantially evenly distributed at a certain pitch.

29. The vehicle restraint of claim 28, wherein the latching member includes an alignment tooth displaced from the certain pitch.

30. The vehicle restraint of claim 29, wherein the alignment tooth is moveable relative to the plurality of teeth.

31. The vehicle restraint of claim 29, further comprising a spring that biases the alignment tooth to move to a certain position relative to the plurality of teeth.

32. The vehicle restraint of claim 29, wherein the alignment tooth protrudes above the plurality of teeth.

33. The vehicle restraint of claim 20, further comprising an actuator adapted to control a lifting bar adapted to engage and disengage the latching member with the gear rack.

34. The vehicle restraint of claim 20, further comprising:
a trigger assembly moveable along the guide member and being adapted to be engaged by the wheel; and
a coupling that couples the trolley assembly to the trigger assembly wherein the coupling allows relative movement therebetween.

35. A vehicle restraint for blocking the traveling movement of a wheel of a vehicle on a roadway in order to prevent movement of the vehicle from a fixed position, the vehicle restraint comprising:
a frame having a curved surface and including a guide member, the frame being adapted to be fixed relative to the roadway;
a trolley assembly moveable along the guide member;
a locking arm coupled to the trolley assembly, adapted to engage the wheel for the purpose of restraining the wheel, and being guided by the curved surface to move along a curved path; and a latching member for restraining the locking arm from movement relative to the frame, wherein the frame includes an upper rail connected to the curved surface to allow the locking arm to travel along the upper rail.

36. The vehicle restraint of claim 35, wherein the curved surface includes a concave section.

37. The vehicle restraint of claim 35, wherein the curved surface includes a convex section.

38. The vehicle restraint of claim 37, wherein the curved surface includes a concave section that is lower than the convex section.

39. The vehicle restraint of claim 35, further comprising a gear rack coupled to the upper rail and interposed between the guide member and the upper rail.

40. The vehicle restraint of claim 39, wherein the latching member is moveable between an engaged position and a disengaged position, wherein the latching member in the engaged position engages the gear rack to restrain horizontal movement of the locking arm, and the latching member in the disengaged position disengages the gear rack to allow horizontal movement of the locking arm.

41. The vehicle restraint of claim 40, wherein the latching member in the engaged position exerts an upward force against the gear rack with a corresponding reaction force that avoids being transmitted to the upper rail.

42. A vehicle restraint for blocking the traveling movement of a wheel of a vehicle on a roadway in order to prevent movement of the vehicle from a fixed position, the vehicle restraint comprising:

a frame adapted to be fixed relative to the roadway;

a trigger assembly moveable along the frame and being adapted to be engaged by the wheel;

a trolley assembly moveable along the frame;

a coupling that couples the trolley assembly to the trigger assembly, wherein the coupling allows relative movement therebetween;

a locking arm coupled to the trolley assembly for movement along the frame;

a barrier extending from the locking arm and being moveable between a stored position and an elevated position; wherein the barrier in the elevated position is adapted to restrain the wheel;

a roller carried by the barrier and being adapted to engage the wheel;

a first wheel support having an upper surface adapted to be engaged by and support the wheel at an elevated position above the roadway upon the wheel traveling over the barrier and onto the first wheel support, the first wheel support being disposed such that when the barrier is at the stored position, the upper surface is between the barrier and the trigger assembly, and the upper surface is at a predetermined distance away from the barrier with the predetermined distance being greater than a diameter of the roller; and a latching mechanism for restraining the locking arm from movement along the frame.

43. The vehicle restraint of claim 42, wherein the upper surface defines an apex of the first wheel support.

44. The vehicle restraint of claim 42, wherein in uppermost point of the first wheel support is at the upper surface.

45. The vehicle restraint of claim 42, wherein the trigger assembly includes an upper inclined surface facing away from the first wheel support.

46. The vehicle restraint of claim 42, wherein the frame includes a guide member, along which the trolley assembly and the trigger assembly travel, and an upper rail, along which the locking arm travels.

47. The vehicle restraint of claim 46, wherein the upper rail guides the movement of the barrier as the barrier moves between the stored position and the elevated position.

48. The vehicle restraint of claim 42, further comprising a second wheel support situated so that the barrier in the stored position is interposed between the first wheel support and the second wheel support, wherein the second wheel support is adapted to support the wheel at an elevated position above the roadway upon the wheel traveling onto the second wheel support.

49. The vehicle restraint of claim 42, wherein the first wheel support includes an inclined surface.

50. The vehicle restraint of claim 42, wherein the first wheel support includes a pair of inclined surfaces.

* * * * *

UNITED STATES PATENT AND TRADEMARK OFFICE
CERTIFICATE OF CORRECTION

PATENT NO. : 6,773,221 B2
DATED : August 10, 2004
INVENTOR(S) : Paul Belongia et al.

It is certified that error appears in the above-identified patent and that said Letters Patent is hereby corrected as shown below:

Title page,
Item [56], References Cited, U.S. PATENT DOCUMENTS, a reference was omitted.
Please insert -- 5,302,063    4/12/94 Winsor --.

Column 2,
Line 15, please delete "moment" and insert -- movement --.

Column 10,
Line 14, please delete "electromechanical" and insert -- electro-mechanical --.

Column 12,
Line 24, please delete "positions" and insert -- positions, --.

Column 14,
Line 18, please delete "wherein in" and insert -- wherein an --.

Signed and Sealed this

Nineteenth Day of April, 2005

JON W. DUDAS
*Director of the United States Patent and Trademark Office*